United States Patent
Shirahata et al.

(10) Patent No.: US 7,118,365 B2
(45) Date of Patent: Oct. 10, 2006

(54) CONTROLLER FOR AVOIDING INTERFERENCE

(75) Inventors: Toru Shirahata, Yamanashi (JP); Masayuki Ueno, Kitakyushu (JP)

(73) Assignee: Fanuc LTD, Yamanashi (JP)

( * ) Notice: Subject to any disclaimer, the term of this patent is extended or adjusted under 35 U.S.C. 154(b) by 412 days.

(21) Appl. No.: 10/464,640

(22) Filed: Jun. 19, 2003

(65) Prior Publication Data

US 2004/0005372 A1 Jan. 8, 2004

(30) Foreign Application Priority Data

Jul. 8, 2002 (JP) .............................. 2002-230345

(51) Int. Cl.
B29C 45/42 (2006.01)

(52) U.S. Cl. ...................... 425/139; 425/150; 425/165; 425/444

(58) Field of Classification Search ................ 425/135, 425/139, 165, 444, 556, 150; 264/40.1, 334
See application file for complete search history.

(56) References Cited

U.S. PATENT DOCUMENTS

| | | | | |
|---|---|---|---|---|
| 5,250,239 A | * | 10/1993 | Herbst | 264/40.5 |
| 5,513,970 A | * | 5/1996 | Kimura et al. | 425/139 |
| 5,629,031 A | * | 5/1997 | Ishikawa et al. | 425/139 |
| 5,639,486 A | * | 6/1997 | Yamaguchi | 425/139 |
| 5,906,777 A | * | 5/1999 | Kamiguchi et al. | 264/40.1 |
| 6,325,955 B1 | * | 12/2001 | Herbst | 264/40.5 |
| 6,409,945 B1 | * | 6/2002 | Yamamoto | 264/40.1 |
| 6,485,285 B1 | * | 11/2002 | Shiotani | 425/139 |
| 2002/0051833 A1 | * | 5/2002 | Shiozaki | 425/139 |

FOREIGN PATENT DOCUMENTS

| | | |
|---|---|---|
| DE | 41 10 948 | 10/1992 |
| DE | 197 16 777 | 10/1998 |
| EP | 1 085 389 | 3/2001 |
| JP | 62-054563 | 3/1987 |
| JP | 62-273816 | 11/1987 |
| JP | 7104824 | 4/1995 |
| JP | 11-235738 | 8/1999 |
| JP | 2000-326381 | 11/2000 |

OTHER PUBLICATIONS

Notice of Grounds of Rejection for corresponding Japanese Application No. 2002-230345 mailed Dec. 7, 2004.
MAV Online, 2001, pp. 1-2.

* cited by examiner

*Primary Examiner*—Duane Smith
*Assistant Examiner*—Emmanuel S. Luk
(74) *Attorney, Agent, or Firm*—Staas & Halsey LLP (57) ABSTRACT

In a controller for avoiding interference between a mold body comprising a mold and a peripheral equipment installed to said mold and a product removing unit in an injection molding machine, a distance between the position of the mold body and the position of the product removing unit is determined. It is then judged whether or not the distance is smaller than a predetermined distance. If the distance is smaller than the predetermined distance, the operation of product removing unit is decelerated or stopped.

17 Claims, 7 Drawing Sheets

MOLD OPENING

CONTROLLER FOR AVOIDING INTERFERENCE

BACKGROUND OF THE INVENTION

1. Field of the Invention

The present invention relates to a controller for avoiding interference between a mold or ejector and a product removing unit in an injection molding machine.

2. Description of the Prior Art

Some injection molding machines have a product removing unit for removing a product molded by using a mold. This product removing unit, which removes a molded product automatically, is configured by a robot or a special-purpose product removing unit. The product removing unit must be operated in association with the injection molding machine, so that the operation timing of the product removing unit is set so as to match the operation timing of the injection molding machine.

Generally, when the product removing unit begins its operation upon receipt of a mold opening finish signal after a mold has been opened and finishes removing a molded product, a product removal finish signal is sent to an injection molding machine. Upon receipt of this product removal finish signal, the injection molding machine starts the next molding operation, that is, a mold closing or mold clamping operation.

In the above-described general method for removing a molded product, the product removing unit starts its operation after waiting until the mold has opened completely, and the injection molding machine starts the mold closing operation for the next molding cycle after waiting until the product removing unit has removed the molded product completely. Therefore, the waiting time consumes time wastefully, and the cycling time for molding is prolonged.

To reduce this waiting time, there is used a method for controlling the operation of the product removing unit in synchronization with the mold opening/closing operation, in which a signal is generated before the opening of mold is finished, the operation of the product removing unit is started by this signal, and a signal is sent to the injection molding machine before the removal of molded product is finished by the product removing unit, by which the mold closing operation is started. For example, Japanese Patent Application Laid-Open No. 62-273816 describes an invention in which the operation of the product removing unit is controlled according to the mold travel amount in mold opening operation so that when the mold opening is finished, a holding portion of the product removing unit is moved so as to reach a position where a molded product can be removed, and when the movable mold moves in the mold clamping direction, the product removing unit is controlled according to the travel amount of movable mold to retreat the holding portion from the position where the molded product is removed.

With the above-described method in which the operation of the product removing unit is controlled in synchronization with the mold opening/closing operation of the injection molding machine, it is very difficult to adjust the operation timing of the product removing unit. The operation start timing changes each time the opening/closing speed of mold or the operation speed of the product removing unit changes, so that readjustment is needed. Also, if a bit unnatural operation is effected, a hand etc. of the product removing unit gets caught in the mold, whereby the expensive mold or hand is damaged. Therefore, in order to adjust the timing of operation start etc., a test must be conducted repeatedly. That is, the operation start timing of the product removing unit at the time of mold opening and the mold closing operation timing must be determined by transmitting signals between the injection molding machine and the product removing unit. If this work is incorrect, there is a fear of damaging the mold, hand, etc., so that this work must be done carefully, which requires much time and long-term experience.

OBJECT AND SUMMARY OF THE INVENTION

An object of the present invention is to provide a controller for avoiding interference, in which operation timing of a product removing unit can be set easily, and interference between a mold or an ejector and the product removing unit can be avoided.

To achieve the above object, a first aspect of the present invention provides a controller for avoiding interference including means for determining a distance between the position of a mold body and the position of the product removing unit; judging means for judging whether or not the determined distance between the position of the mold body and the position of the product removing unit is smaller than a predetermined distance; and speed control means for decelerating or stopping the operation of the product removing unit during mold opening operation and for decelerating or stopping a mold closing operation during mold closing operation if it is judged by the judging means that the distance is smaller than the predetermined distance. Thereby, interference between the product removing unit provided for an injection molding machine and the mold body comprising a mold and a peripheral equipment installed to the mold is avoided.

A second aspect of the present invention provides a controller for avoiding interference including means for determining the distance between the position of the mold body and the position of the product removing unit; judging means for judging whether or not the determined distance between the position of the mold body and the position of the product removing unit is smaller than first and second predetermined distances; and speed control means for decelerating the operation of the product removing unit during mold opening operation and for decelerating the mold closing operation during mold closing operation if it is judged by the judging means that the distance is smaller than the first predetermined distance, and for stopping the operation of the product removing unit during mold opening operation and for stopping the mold closing operation during mold closing operation if it is judged that the distance is smaller than the second predetermined distance that is smaller than the first predetermined distance. Thereby, interference between the product removing unit provided for an injection molding machine and the mold body including the mold and a peripheral equipment installed to the mold is avoided.

Further, a third aspect of the present invention provides a controller for avoiding interference including means for determining the distance between the position of the ejector and the position of the product removing unit; judging means for judging whether or not the distance between the position of the ejector and the position of the product removing unit is smaller than a predetermined distance; and speed control means for decelerating or stopping the operation of the ejector during the time when the ejector is operated and for decelerating or stopping an operation of the product removing unit during the time when an ejector operation is stopped if it is judged by the judging means that the distance is smaller than the predetermined distance.

Thereby, interference between the ejector in an injection molding machine and the product removing unit is avoided.

BRIEF DESCRIPTION OF THE DRAWINGS

These and other objects and features of the present invention will be apparent from the ensuing description of embodiments given in connection with the accompanying drawings, in which.

DETAILED DESCRIPTION OF THE PREFERRED EMBODIMENTS

Figure 1:
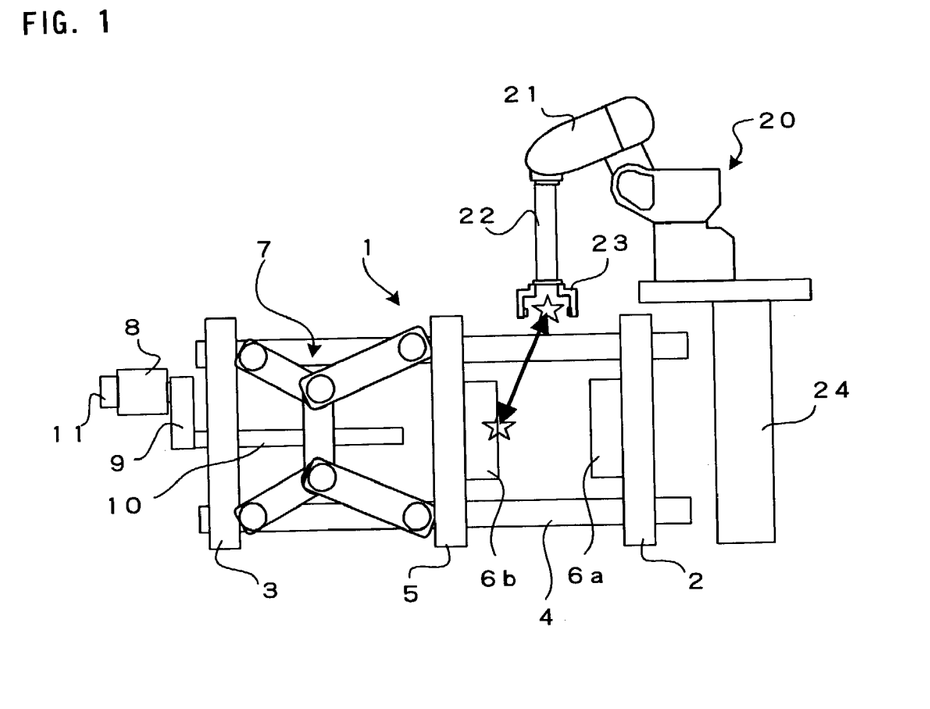
FIG. 1 is a schematic view of a system consisting of an injection molding machine and a product removing unit, to which a controller for avoiding interference in accordance with a first embodiment of the present invention is applied.

FIG. 1 is a schematic view of a system consisting of an injection molding machine and a product removing unit, to which a controller for avoiding interference in accordance with a first embodiment of the present invention is applied.

In FIG. 1, reference numeral 1 denotes a mold clamping mechanism of the injection molding machine. The mold clamping mechanism 1 includes a fixed platen 2, a rear platen 3, a plurality of tie bars 4, a movable platen 5, a toggle mechanism 7, a mold clamping servomotor 8, a driving mechanism 9, and a ball screw/nut mechanism 10. Specifically, the rear platen 3 is installed to the fixed platen 2, which is fixed to a base (not shown), by the tie bars 4. The movable platen 5 is disposed slidably on the tie bars 4 between the fixed platen 2 and the rear platen 3.

The mold clamping toggle mechanism 7 is disposed between the rear platen 3 and the movable platen 5. The toggle mechanism 7 is driven by means of the ball screw/nut mechanism 10 via the driving mechanism 9 such as a pulley or a belt by using the mold clamping servomotor 8 to move the movable platen 5, by which a fixed mold 6a installed on the fixed platen 2 and a movable mold 6b installed on the movable platen 5 are opened/closed and clamped.

Reference numeral 11 denotes a position/speed detector such as an encoder which is installed on the servomotor 8 to detect the position/speed of the servomotor 8. The above-described mold clamping mechanism is publicly known as a toggle type mold clamping mechanism.

In the vicinity of the mold clamping mechanism 1, a product removing unit 20 for removing a molded product from the movable mold is disposed. In this embodiment, a robot is used as a product removing unit 20. At the distal-end wrist of arms 21, 22 of a robot 20, an end effector is installed to remove the molded product attaching to the movable mold 6b by holding or attracting the product. FIG. 1 shows a hand 23 that holds the molded product as an end effector. Reference numeral 24 denotes a mounting base for mounting the robot 20.

Figure 2:
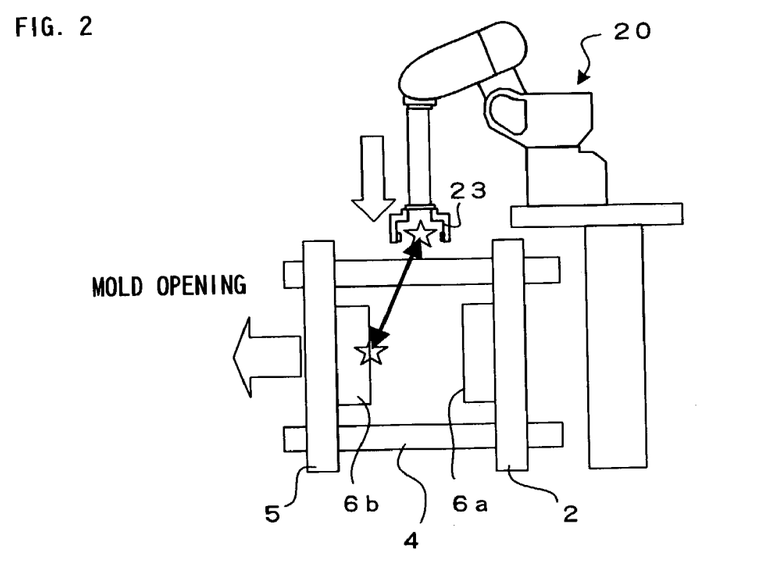
FIG. 2 is a schematic view for illustrating an interference avoiding operation at the time when a mold of the injection molding machine shown in FIG. 1 is opened.

In the above-described configuration, when the mold is opened, as shown in FIG. 2, the robot 20 starts an operation for removing the molded product attaching to the movable mold 6b during the mold opening operation of the movable mold 6b with respect to the fixed mold 6a. At this time, the hand 23 etc. of the robot sometimes come into contact with and interfere with the fixed mold 6a, the movable mold 6b, and a peripheral equipment etc. installed to these molds. Hereinafter, the term "mold body" is used to indicate the fixed mold 6a and the movable mold 6b including peripheral equipment etc. installed to these molds.

In order to avoid interference between the mold body and the robot hand etc., in the present invention, if the distance between the position of the mold body and the position of the hand etc. becomes smaller than a predetermined value, the robot operation is decelerated or stopped to prevent the occurrence of interference.

Figure 3:
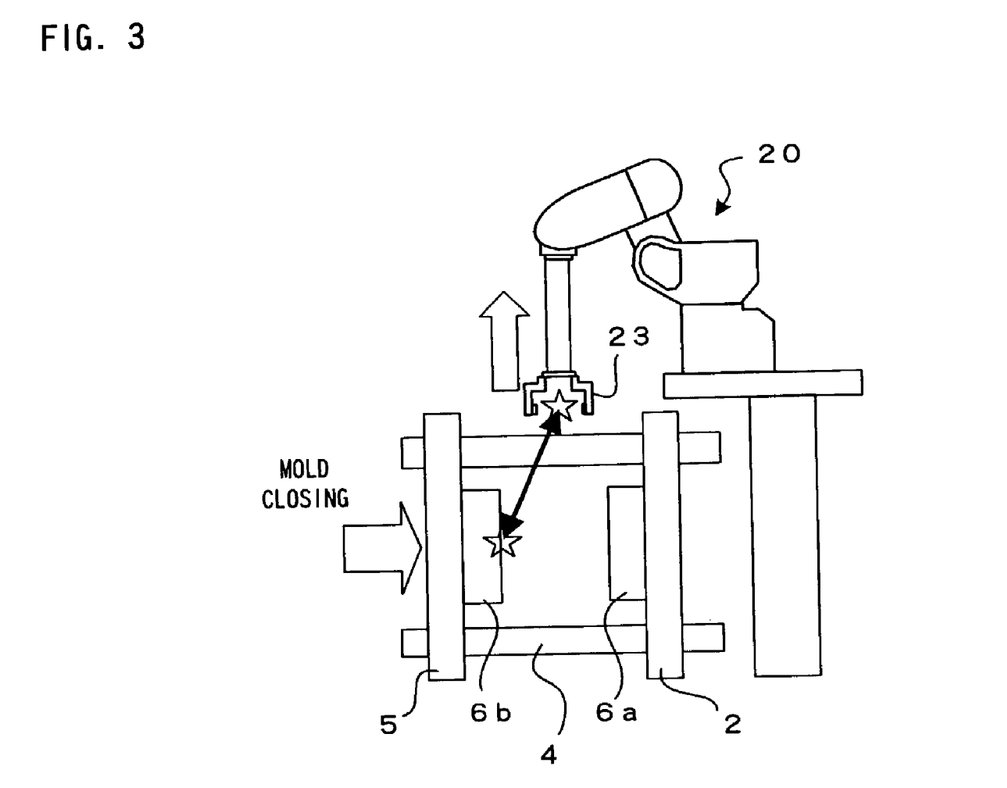
FIG. 3 is a schematic view for illustrating an interference avoiding operation at the time when a mold of the injection molding machine shown in FIG. 1 is closed.

Also, during the time when the hand 23 of the robot holds and removes a molded product from the movable mold 6b, the mold closing operation is started as shown in FIG. 3 to shorten the cycle time. At this time as well, the hand etc. may come into contact with and interfere with the mold body. Therefore, if the distance between the position of the mold body and the position of the hand etc. becomes smaller than the predetermined value, the mold closing operation is decelerated or stopped to prevent the interference.

Figure 4:
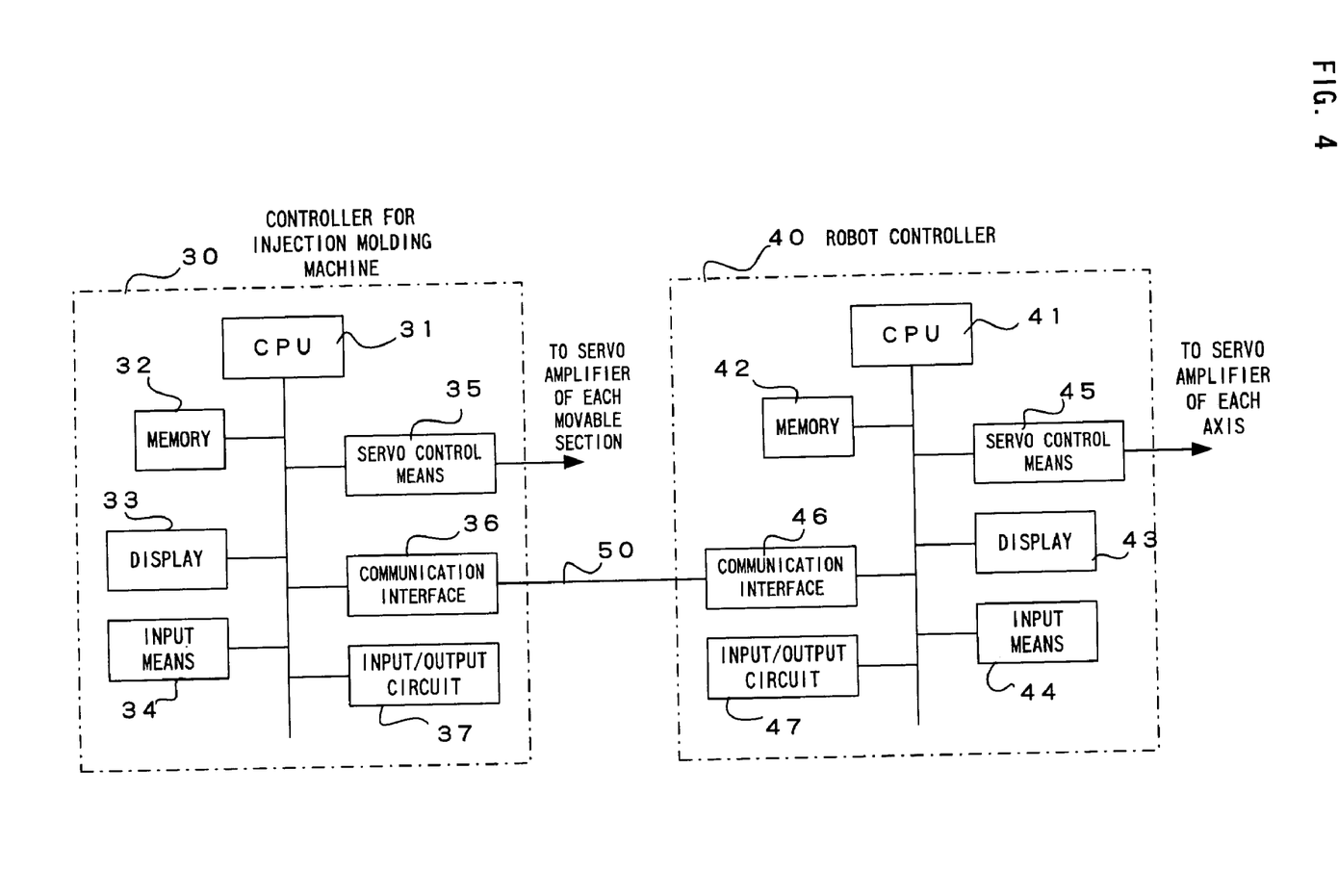
FIG. 4 is a block diagram of a controller for controlling the injection molding machine shown in FIG. 1 and a controller for a robot used as a product removing unit shown in FIG. 1.

FIG. 4 is a block diagram of a controller for the injection molding machine and a controller for the robot used as a product removing unit, which constitute a controller for avoiding interference in accordance with the present invention.

A controller 30 of the injection molding machine includes a processor 31, a memory 32 consisting of ROM, RAM, etc., which is bus connected to the processor 31, a display 33, input means 34 such as a keyboard, servo control means 35 for controlling servomotors for driving movable sections of the injection molding machine, a communication interface 36, and an input/output circuit 37 adapted to be connected to peripheral equipment of the injection molding machine.

The processor 31 issues a travel command to the servo control means based on an operation program stored in advance in the memory 32, and controls the position and speed based on the travel command and position and speed feedback signals sent from position/speed detectors installed on the servomotors for movable sections, by which the injection molding operation is implemented. The construction and operation of this controller 30 of the injection molding machine is the same as those of the conventional controller for injection molding machine except for the later-described interference avoiding operation.

On the other hand, a robot controller 40 is also the same as the conventional robot controller, and includes a processor 41, a memory 42 consisting of ROM, RAM, etc., which is bus connected to the processor 41, a display 43, input means 44 such as a keyboard, servo control means 45 for controlling servomotors for driving joint axes of the robot, a communication interface 46, and an input/output circuit 47 adapted to be connected to peripheral equipment of the robot.

The processor 41 executes a teaching program stored in the memory 42, and issues a travel command to the servo control means 45. The servo control means 45 carries out feedback control of position and speed based on the travel command and a position/speed feedback signal sent from position/speed detectors installed on servomotors for respective axes, and controls the position and speed of a tool-center point (TCP) such as a holding point of the hand.

The construction and operation of this robot controller 40 is the same as those of the conventional robot controller except for the later-described interference avoiding operation. In this embodiment, however, the controller 30 of the injection molding machine and the robot controller 40 are connected to each other via the communication interfaces 36 and 46 and a communication line 50.

The memory 32 of the controller 30 of injection molding machine stores a molding operation program that is executed by the injection molding machine. Also, the memory 42 of the robot controller 40 stores a product removing operation program for removing a molded product from the movable mold in association with the mold opening/closing operation of the injection molding machine. This product removing operation program is configured so that when a mold opening start signal is received from the controller 30 of the injection molding machine, the product removing operation is started in synchronization with this signal or with some delay.

When the molded product is grasped and removed from the movable mold 6b and begins to be released from between the fixed mold 6a and the movable mold 6b, the robot controller 40 sends a release start signal to the controller 30 of the injection molding machine. Upon receipt of this signal, the controller 30 of the injection molding machine starts the operation for molding cycle, that is, starts mold closing.

As described above, the operation of the injection molding machine and the robot serving as a product removing unit is the same as the operation of the injection molding machine provide with the conventional product removing unit. In the conventional injection molding machine and product removing unit, however, after the operation is started, the product removing unit is operated in accordance with the operation program until the removal of molded product is finished, and after mold closing is started, the injection molding machine is operated based on the teaching program until mold closing and mold clamping are finished.

In the present invention, the operations are performed based on the operation program and teaching program, but the present invention is characterized in that the operation speed is changed to avoid interference between the mold body and the robot. To avoid the interference, for the mold body including peripheral equipment installed to the mold and the robot serving as a product removing unit, positions where contact and interference may occur are set in advance. Also, for the mold body, the position of a particular point on the mold including the peripheral equipment, or a line segment from a point to another point, or further a plane etc. are set in advance as a position of mold body. On the robot side, the central point of robot hand (TCP) and a robot position at which the contact and interference at a particular position, line segment, plane etc. of the hand and the arm may occur are set in advance.

The position of the movable platen 5 is determined by the rotational position of the mold clamping servomotor 8 detected by the position/speed detector 11. Therefore, if the position at which interference may occur is set in advance in a coordinate system in which a predetermined position on mold attaching surface of the movable platen 5 is the origin, the position at which interference may occur can be determined from the rotational position of the mold clamping servomotor 8 that is detected by the position/speed detector 11.

Also, in case where the TCP such as the central point of the hand is set to be a robot position at which interference may occur, usually such robot position has already been obtained. However, in case where another point on the robot arm etc. is set to be robot position at which interference may occur, if the length etc. of robot arm are set in advance, the robot position that has been set by the angle of rotation of each joint axis of robot, the length of arm, and the like can be determined.

Figure 5:
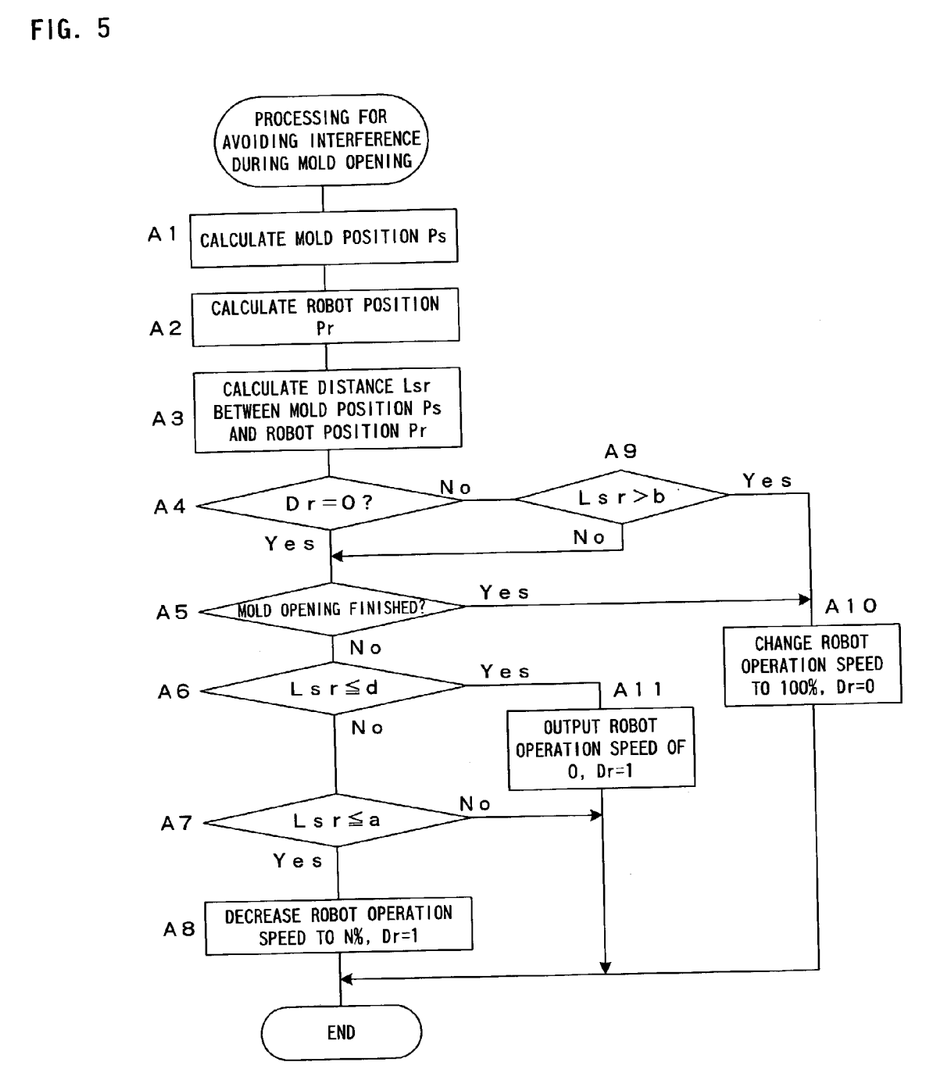
FIG. 5 is a flowchart for processing for avoiding interference at the time when a mold of the injection molding machine shown in FIG. 1 is opened.

FIG. 5 is a flowchart for processing for avoiding interference in accordance with the present invention, which is executed by the processor 31 of the controller 30 of the injection molding machine in a mold opening process. When the mold opening process starts, the controller 30 of the injection molding machine executes a mold opening operation program which has been set therein, and controls the operation of the mold clamping servomotor 8 to start the movement of movable mold in the mold opening direction. Also, the controller 30 of the injection molding machine sends a mold opening start signal to the robot controller 40. On receipt of this mold opening start signal, the robot controller 40 executes a product removing program which has been set therein, and controls the operation of robot. The processor of the controller 30 of the injection molding machine executes processing for avoiding interference shown in FIG. 5 for each predetermined cycle.

First, the position Ps of a set mold body is calculated from the position of the mold clamping servomotor 8 which is detected by the position/speed detector 11 that is installed on the mold clamping servomotor 8 to detect the rotational position of the servomotor (Step A1). Further, the position and posture of the hand are received from the robot controller 40, and a set robot position Pr is calculated from the position and posture of the hand (Step A2). The robot position at which contact and interference may occur can be set in advance in the robot controller 40, and on the side of the robot controller 40, the set robot position can be sent to the controller 30 of the injection molding machine. In this case, the processing in step A2 is simply a processing of reading the robot position.

Next, the distance Lsr between the mold body position Ps and the robot position Pr, thus determined, is calculated (Step A3). Then, it is judged whether or not a robot deceleration flag Dr is "0" (Step A4). This robot deceleration flag Dr is set to "0" by initialization when power is turned on in the controller for injection molding machine, and is "0" at the start. If the robot deceleration flag Dr is "0", it is judged whether or not mold opening is finished (that is, whether or not the movable mold has reached the set mold opening finish position) (Step A5). If mold opening is not finished, it is judged whether or not the distance Lsr between the mold body position Ps and the robot position Pr, which has been determined in Step A3, is not larger than a preset value d set as a dangerous distance (Step A6) If the distance Lsr is larger than the preset value d, it is judged whether or not the distance Lsr is not larger than a preset value a set as a warning distance larger than the preset value d (Step A7). If the distance Lsr is larger than the preset value a, the processing in that cycle is finished.

Subsequently, the processing in Steps A1 through A7 is executed in each cycle. If it is detected in Step A7 that the distance Lsr between the mold body position Ps and the robot position Pr approaches the warning distance set as a preset value a, a command of override N% is sent to the robot controller 40 so that the robot operation speed is decreased to N% (for example, 80%) of programmed command value, and the robot deceleration flag Dr is set to "1" (Step A8).

In the robot controller 40, upon receipt of this override command, the commanded speed is reduced by multiplying the robot operation speed, commanded by the program at the present time, by the command override value N% to decrease the robot operation speed. In this embodiment, the robot operation speed is decreased by the override command. However, the configuration may be such that the robot decelerating operation speed that has been set in advance is given to the robot controller, and the robot controller drives the robot at this commanded speed.

From the next cycle, since the robot deceleration flag Dr is set to "1", processing proceeds from Step A4 to Step A9, where it is judged whether or not the distance Lsr between the mold body position Ps and the robot position Pr is larger than a preset value b that has been set as a warning cancel distance. The relationship between the dangerous distance preset value d, warning distance preset value a, and warning cancel distance preset value b is b>a>d. If the distance Lsr between the mold body position Ps and the robot position Pr does not exceed the preset value b, processing proceeds from Step A9 to Step A5, by which the above-described processing is executed repeatedly, and the robot operation speed is not changed. In this case, though the robot operation speed is decreased, the mold opening operation speed is equal to the program command value, so that the distance Lsr between the mold body position Ps and the robot position Pr tends to increase.

If it is judged in Step A9 that the distance Lsr between the mold body position Ps and the robot position Pr exceeds the warning cancel distance preset value b so that a safe distance having no fear of occurrence of contact and interference is provided, the override command value of robot operation speed is made 100% to make the robot operation speed equal to the program command value, and the robot deceleration flag Dr is set to "0" (Step A10).

Also, if the distance Lsr between the mold body position Ps and the robot position Pr is decreased by the influence of toggle mechanism of the mold clamping mechanism, though the robot operation speed is decreased, with the result that the distance Lsr becomes not larger than the preset dangerous distance d (Step A6), a command is given to the robot controller 40 so that the robot operation speed is "0", that is, the robot is stopped. Also, the robot deceleration flag Dr is set to "1" (Step A11). Upon receipt of this command, the robot controller 40 stops outputting travel command to each axis of robot to stop the robot operation. As a result, the mold body and the robot will not come into contact with each other and not interfere with each other.

In the state in which mold opening is finished, it does not cause any trouble if the robot is operated at the programmed command speed, because the robot operation is programmed so that the robot and the mold body do not interfere with each other even if the robot lies at any operation position. Therefore, if it is judged in Step A5 that mold opening is finished, processing proceeds to Step A10, where a command is given to the robot controller 40 so that the robot operation speed is 100%, and the robot deceleration flag Dr is set to "0", by which the processing for avoiding interference at the time of mold opening shown in FIG. 5 is finished.

On the other hand, though the robot 20 is operated based on the teaching program, as described above, the operation speed of the robot 20 may be changed, even if the travel operation pattern is equal to that instructed in the teaching program. However, after mold opening is finished, the robot is operated at the commanded speed instructed in the teaching program, since the robot operation speed is restored to 100% in Step A10. In a state where mold opening is finished and the robot operation speed is restored to the teaching program speed, the teaching program is executed so that the robot hand 23 begins to hold the molded product and remove it from between the fixed mold 6a and the movable mold 6b. At this time, a restoration start signal is sent to the controller 30 of the injection molding machine.

Figure 6:
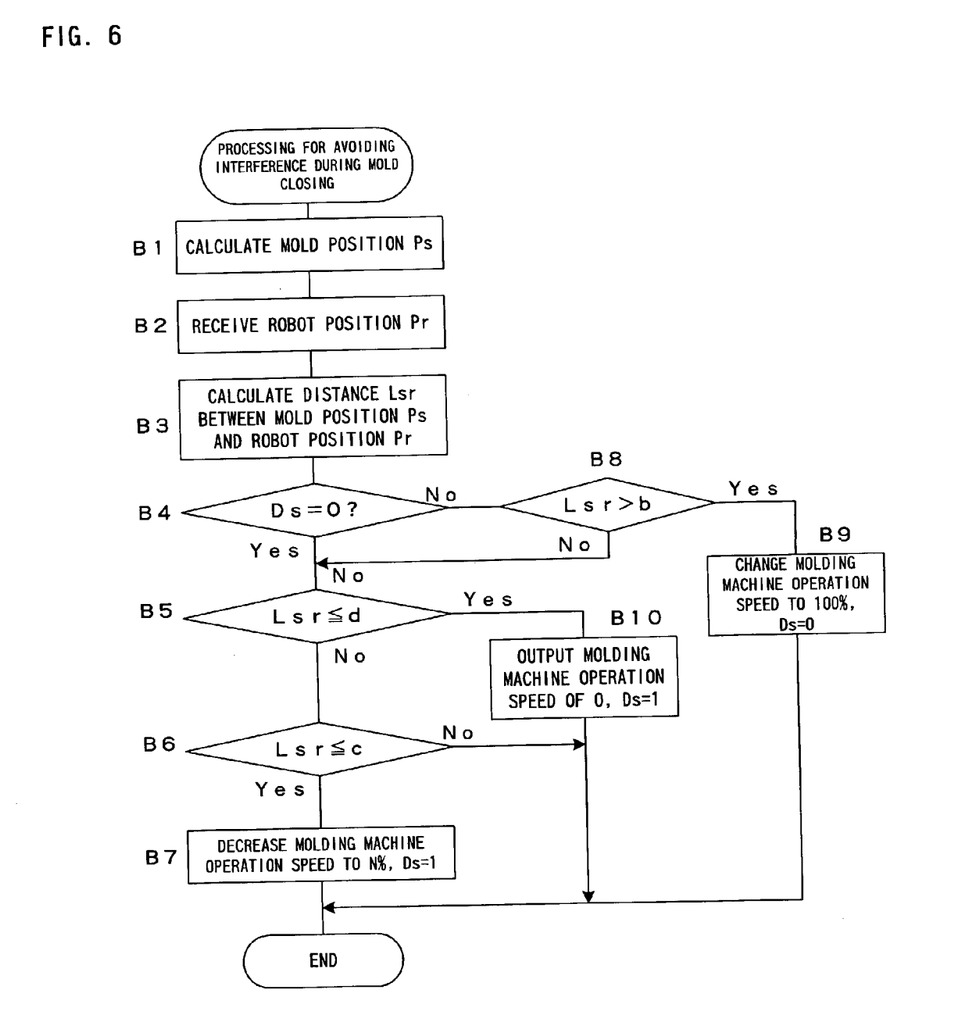
FIG. 6 is a flowchart for processing for avoiding interference at the time when a mold of the injection molding machine shown in FIG. 1 is closed.

Upon receipt of this restoration start signal, the processor 31 of the controller 30 of the injection molding machine starts the next molding cycle. First, the mold closing processing is started, and the processing for avoiding interference at the mold closing time shown in FIG. 6 is executed in each predetermined cycle.

First, the same processing as that in Steps A1 through A3 shown in FIG. 5 is executed, in which the mold body position Ps and the robot position Pr that may cause interference are determined, and the distance Lsr therebetween is determined (Steps B1 to B3). Subsequently, it is judged whether or not a molding machine deceleration flag Ds is "0" (Step B4). This molding machine deceleration flag Ds is also set to "0" by initialization when power is turned on in the controller 30 of the injection molding machine.

If the molding machine deceleration flag Ds is "0", it is judged whether or not the distance Lsr between the mold body position Ps and the robot position Pr, which is determined in Step B3, is not larger than the preset dangerous distance d (Step B5). If the distance Lsr is larger than d, then it is judged whether or not the distance Lsr is not larger than a preset warning distance c (d<c) (Step B6). If the distance Lsr is larger than c, the processing of this cycle is finished. As a result, the injection molding machine executes the mold closing process by moving the movable platen as instructed by the set operation program.

On the other hand, if it is judged in Step B6 that the distance Lsr between the mold body position Ps and the robot position Pr is not larger than the preset warning distance c, a command is issued so that the operation speed of injection molding machine is decreased to N% (for example, 80%) of preset command speed (N% override command value), and the molding machine deceleration flag Ds is set to "1" (Step B7)

From the next cycle, processing proceeds from Steps B1 to B4 to Step B8, where it is judged whether or not the distance Lsr between the mold body position Ps and the robot position Pr is larger than the preset cancel distance b (d<c<b) If the distance Lsr is not larger than b, processing in Step B5 and the subsequent steps is executed. Specifically, after the mold closing speed of injection molding machine is decreased to N% of the preset speed in Step B7, if the distance Lsr is not larger than the cancel distance b, processing in Steps B1 through B4, Step B8, and Steps B5 through B7 is executed repeatedly. Since the command (override command) is issued so as to decrease the mold closing speed to N% of the preset speed, the mold closing speed is decreased, so that the mold closing speed is lower than the preset mold closing speed. As a result, the robot 20 operates such that the robot hand 23 moves so as to leave from between the molds, so that the distance Lsr between the mold body position Ps and the robot position Pr tends to increase.

However, in case where the robot operation speed has been set slow, or a great amount of robot operation path cannot be secured in the direction receding from the movable mold, the distance Lsr does not increase but decreases, so that the distance Lsr becomes smaller than the preset dangerous distance d in Step B5. In this case, the processing proceeds to Step B10, where a command is issued so that the operation speed of injection molding machine is "0". In other words, a stop command is issued. Also, the molding machine deceleration flag Ds is set to "1". As a result, the operation of injection molding machine stops, and the mold closing operation stops. However, since the operation of robot is executed continuously, the distance Lsr increases. Therefore, if the distance Lsr becomes larger than the dangerous distance d, processing proceeds from Step B5 to Step B7, where the injection molding machine is driven with the operation speed thereof decreased to N% of the preset speed. Subsequently, in each predetermined cycle, after processing in Steps B1 through B4, B8 and B5 is executed, processing in Step B6 or B10 is executed, by which interference is avoided.

Thus, during the time when the injection molding machine is operated at the operation speed of N% of the preset speed, or during the time when the operation thereof is stopped, the robot 20 is operated, and if it is judged in Step B8 that the distance Lsr between the mold body position Ps and the robot position Pr is larger than the preset cancel distance b, the operation speed of injection molding machine is changed to 100%, and the molding machine is driven at a speed equal to the preset speed. Also, the molding machine deceleration flag Ds is set to "0" (Step B9).

After the robot hand 23 leaves from between the molds, the distance Lsr between the mold body position Ps and the robot position Pr tends to increase. When the robot reaches the product removal finish position, the distance Lsr between the mold body position Ps and the robot position Pr is larger than the preset cancel distance b, and the molding machine deceleration flag Ds is set to "0", thereby preparing for a next molding cycle.

As described above, at the time of mold opening, the interference between the mold and the robot is avoided by decreasing the operation speed of the robot 20 for removing a molded product from the mold or by stopping the robot 20. Also, at the time of mold closing, the interference between the mold and the robot is avoided by decreasing the mold closing speed of injection molding machine or by stopping the injection molding machine. Therefore, there is no need for strictly adjusting the operation timing of the robot 20 serving as a product removing unit with respect to the mold opening/closing operation of injection molding machine, so that the robot operation can be set easily.

In the above-described embodiment, interference between the mold body and the robot is avoided. However, for some mold, the molded product in the movable mold 6b is ejected by using an ejector, and the ejected product is removed by the product removing unit. In this case, there is a fear of interference between the product removing unit and the ejector.

Figure 7:
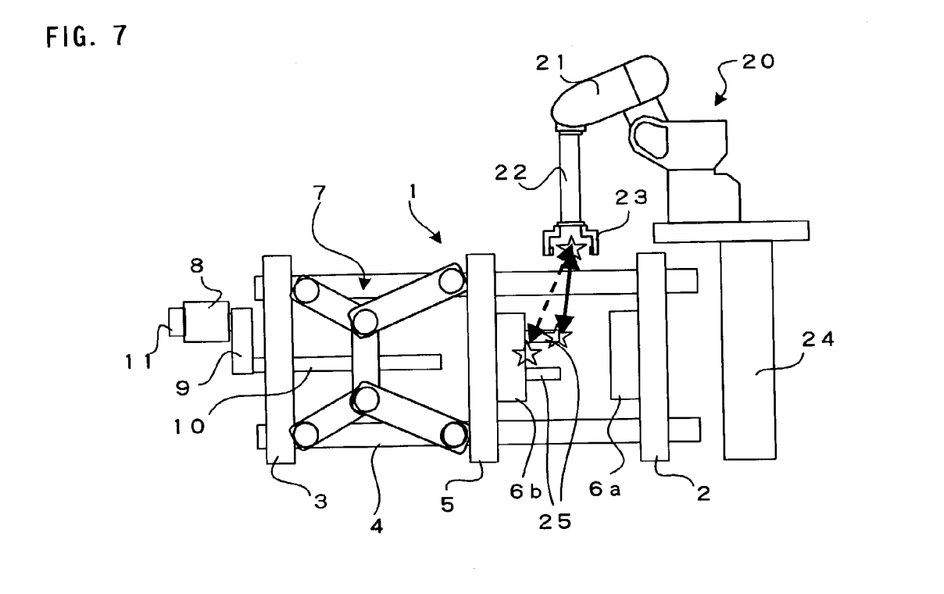
FIG. 7 is a schematic view for illustrating interference between a product removing unit and an ejector in a second embodiment of the present invention.

FIG. 7 is a schematic view for illustrating interference between the robot serving as a product removing unit and the ejector. When the robot 20 removes a molded product, a part of the hand 23 or the arm of the robot 20 may come into contact with an ejector pin 25 projecting from the movable mold 6b to cause interference. The present invention can be applied to such a case.

The position of the movable platen 5 at the time of mold opening finish can be determined from the rotational position of the mold clamping servomotor 8. The mold opening finish position of the movable platen 5 is set in advance. The stroke position of ejector pin can be detected by the rotational position of a servomotor for driving the ejector. Therefore, from the mold opening finish position of the movable platen 5 and the rotational position of servomotor that is detected by a position/speed detector installed on the servomotor for ejector, an ejector position that is set with respect to the ejector pin can be determined. A distance between the ejector position thus determined and the robot position is obtained, and, according to the distance thus obtained, the robot operation speed or the ejector operation speed is controlled so that interference may be avoided.

Figure 9:
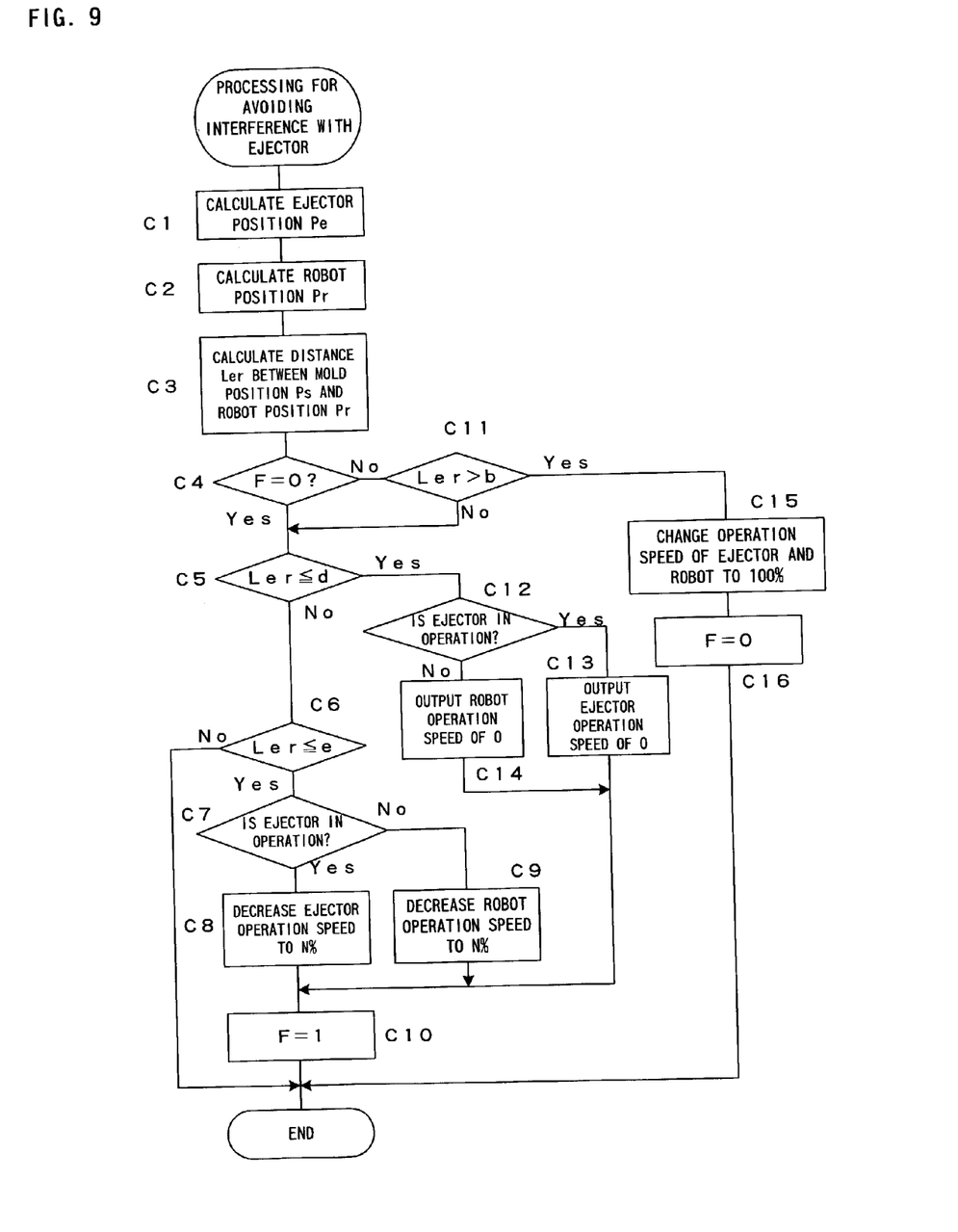
FIG. 9 is a flowchart for processing for avoiding interference between a product removing unit and an ejector in the second embodiment of the present invention.

FIG. 9 is a flowchart for processing for avoiding interference between the robot and the ejector, which is executed for each predetermined cycle by the processor 31 of the controller 30 of the injection molding machine when mold opening is finished and the ejector operation is started, and the robot 20 starts the product removing operation.

An ejector position Pe which has been set based on the position detected by the position/speed detector installed on the servomotor for driving the ejector as described above is determined (Step C1). Also, as described in the preceding embodiment, the robot position Pr which has been set in the robot is determined (Step C2), and a distance Ler between the ejector position Pe and the robot position Pr is determined (Step C3). Then, it is judged whether or not a flag F is "0" (Step C4). This flag F is also set to "0" by initialization when power is turned on in the controller for injection molding machine, and is "0" at the start. If the flag F is "0", it is judged whether or not the distance Ler determined in Step C3 is not larger than the dangerous distance d (Step C5). If the distance Ler is larger than d, it is judged whether or not the distance Ler is not larger than a warning distance e (Step C6). If the distance Ler is larger than e, this processing is finished.

If the distance Ler between the ejector position Pe and the robot position Pr is larger than the warning distance e, the processing in Steps C1 through C6 is merely executed repeatedly in each cycle, and the ejector and the robot are operated at a commanded speed as instructed by the operation program.

However, if the distance Ler between the ejector position Pe and the robot position Pr is not larger than the warning distance e, processing proceeds from Step C6 to Step C7, where it is judged whether or not the ejector is operated at the present time. If the ejector is operated, the operation speed of the ejector is decreased to N% of command operation speed (Step C8). If the ejector is not operated, a command is given to the robot so that the operation speed thereof is decreased to N% of command value (Step C9). Thereupon, the robot controller 40 controls the operation of robot by decreasing the operation speed thereof to N% of command value. Also, the flag F storing deceleration of ejector or robot is set to "1" (Step C10), and the processing of this cycle is finished.

From the next cycle, as the flag F is set to "1", the processing in Steps C1 through C4, C11, and C5 and subsequent steps is executed unless the distance Ler between the ejector position Pe and the robot position Pr is larger than the cancel distance b. If the distance Ler is not larger than the warning distance d, processing proceeds from Step C5 to Step C12, where it is judged whether or not the ejector is in operation. If the ejector is in operation, the operation speed of ejector is made "0", that is, the operation of ejector is stopped (Step C13). On the other hand, if the ejector is not in operation, the operation of robot is stopped (Step C14). Also, the flag F is set to "1" (Step C10), and the processing in this cycle is finished.

If it is judged in Step C11 that the distance Ler between the ejector position Pe and the robot position Pr is larger than the cancel distance b, the operation speeds of the ejector and robot are changed to 100%, and the ejector and robot are operated at commanded operation speeds which have been set in the operation program (Step C15). Also, the flag F is set to "0" (Step C16), and this processing is finished.

With the above-described processing executed, the molded product is removed from the mold by the robot, and a signal of removal finish etc. is sent to the controller 30 of the injection molding machine, whereupon the controller 30 of the injection molding machine finishes the above described processing for avoiding interference shown in FIG. 9, and mold closing operation for the next cycle is started.

Figure 8:
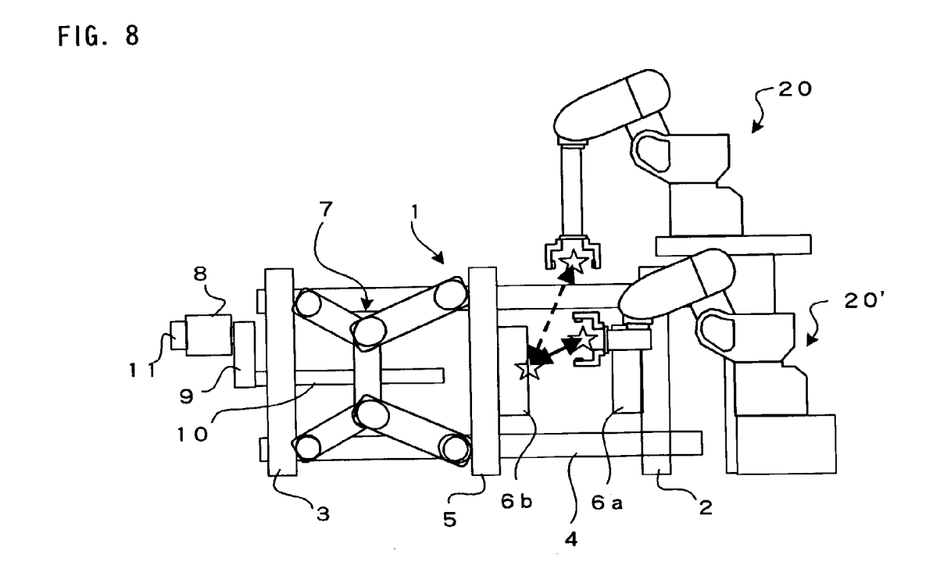
FIG. 8 is a schematic view for illustrating an example in which two product removing units are provided in a third embodiment of the present invention.

In the above-described embodiments, one product removing unit is provided. However, the present invention can also be applied to the case where two product removing units 20 and 20' (made up of two robots) are provided as shown in FIG. 8.

In this case, interference between each robot (product removing unit) and the mold body or ejector must be avoided. Thus, in processing shown in FIGS. 5, 6 and 7, the processing for determining the robot position in Steps A2, B2 and C2 involves the determination of the respective positions Pr and Pr' set for respective robots. Also, the processing in Steps A3, B3 and C3 involves the determination of the distances Lsr and Lsr' between the mold body position and respective robot positions or distances Ler and Ler' between the ejector position and respective robot positions. Further, in Steps A6, B5 and C5, it is judged whether or not either one of the two determined distances Lsr and Lsr' is not larger than the dangerous distance d. If both of the distances Lsr and Lsr' are larger than the dangerous distance d, processing proceeds to Step A7, B6 and C7.

Similarly, in Steps A7, B6 and C6, it is judged whether or not either one of the two determined distances is not larger than the warning distance a, c and e. If both of the distances are larger than the warning distance a, c and e, deceleration processing is not executed, and the processing is finished. Further, in Steps A9, B8 and C11, if both of the two distances Lsr and Lsr', or Ler and Ler', are larger than the cancel distance b, the operation speeds of the robot, molding machine, and ejector are restored to 100%. Other processing is the same as that in flowcharts shown in FIGS. 5, 6 and 9.

In the above-described embodiments, if the distance Lsr between the between the mold body position and the robot position or the distance Ler between the ejector position and the robot position becomes not larger than the warning distance a, c and e, the operation speed of robot or mold closing operation or ejector operation is decreased to a speed of a preset ratio with respect to the command speed, and if the aforementioned distance becomes not larger than the dangerous speed d, the operation is stopped. However, the configuration may be such that if the aforementioned distance becomes smaller than the warning distance, the operation speed is decreased according to that distance.

In this case, in the processing for avoiding interference at the time of mold opening shown in FIG. 5, the processing in Step A8 is such that the operation speed of robot is controlled so as to be a value obtained by multiplying the preset operation speed by (Lsr/a). That is, an override command of (Lsr/a)×100% is provided. In this case, if Lsr decreases, the value of (Lsr/a) also becomes small, so that the operation speed of robot is also decreased greatly, and a low speed is attained. Therefore, the processing in Steps A6 and A11 need not necessarily be provided.

Also, in the processing for avoiding interference at the mold closing time shown in FIG. 6, the processing in Step B7 is such that the operation speed of molding machine is controlled so as to be a value obtained by multiplying the preset operation speed by (Lsr/c). That is, an override command of (Lsr/c)×100% is provided. In this case as well, if Lsr decreases, the value of (Lsr/c) also becomes small, so that the operation speed of molding machine is also decreased greatly, and a low speed is attained. Therefore, the processing in Steps B5 and B10 need not necessarily be provided. Further, in the processing for avoiding interference with the ejector shown in FIG. 9, the processing in Steps C8 and C9 is such that the operation speed of ejector or robot is controlled so as to be a value obtained by multiplying the preset operation speed by (Ler/e). That is, an override command of (Ler/e)×100% is provided. In this case as well, if Ler decreases, the value of (Ler/e) also becomes small, so that the operation speed of ejector or robot is also decreased greatly, and a low speed is attained. Therefore, the processing in Steps C5, C12 and C13 need not necessarily be provided.

As described above, according to the present invention, interference between the product removing unit and the mold body including peripheral equipment installed to the mold or the ejector is avoided automatically by decelerating or stopping the operation of the product removing unit, molding machine, or ejector. Therefore, there is no need for accurately setting the operation timing of product removing unit, so that the operation timing can be set easily, which leads to simple setting work and shortened setting work time.

The invention claimed is:

1. A controller for avoiding interference between a mold body comprising a mold and a peripheral equipment installed to said mold and a product removing unit in an injection molding machine, comprising:
    means for determining a distance between a position of said mold body and a position of said product removing unit;
    judging means for judging whether or not said determined distance between the position of said mold body and the position of said product removing unit is smaller than a predetermined distance; and
    speed control means for decelerating or stopping an operation of said product removing unit if it is judged by said judging means that said distance is smaller than the predetermined distance during a mold opening operation,
    whereby interference between said product removing unit and said mold body is avoided.

2. A controller for avoiding interference between a mold body comprising a mold and a peripheral equipment installed to said mold and a product removing unit in an injection molding machine, comprising:
    means for determining a distance between a position of said mold body and a position of said product removing unit;
    judging means for judging whether or not said determined distance between the position of said mold body and the position of said product removing unit is smaller than a first and a second predetermined distances; and speed control means for decelerating an operation of said product removing unit if it is judged by said judging means that said distance is smaller than the first predetermined distance, and for stopping the operation of said product removing unit if it is judged that said distance is smaller than the second predetermined distance that is smaller than the first predetermined distance, during a mold opening operation, whereby interference between said product removing unit and said mold body is avoided.

3. The controller for avoiding interference according to claim 1, wherein, when it is judged that the distance between the position of said mold body and the position of said product removing unit is smaller than the predetermined distance and thereby the operation is decelerated, said speed control means changes an operation speed of said product removing unit according to the distance.

4. A controller for avoiding interference between a mold body comprising a mold and a peripheral equipment installed to said mold and a product removing unit in an injection molding machine, comprising:

means for determining a distance between a position of said mold body and a position of said product removing unit;

judging means for judging whether or not said determined distance between the position of said mold body and the position of said product removing unit is smaller than a predetermined distance; and speed control means for decelerating or stopping a mold closing operation if it is judged by said judging means that said distance is smaller than the predetermined distance during the mold closing operation, whereby interference between said product removing unit and said mold body is avoided.

5. A controller for avoiding interference between a mold body comprising a mold and a peripheral equipment installed to said mold and a product removing unit in an injection molding machine, comprising:

means for determining a distance between a position of said mold body and a position of said product removing unit;

judging means for judging whether or not said determined distance between the position of said mold body and the position of said product removing unit is smaller than a first and a second predetermined distances; and speed control means for decelerating a mold closing operation if it is judged by said judging means that said distance is smaller than the first predetermined distance, and for stopping the mold closing operation if it is judged that said distance is smaller than the second predetermined distance that is smaller than the first predetermined distance, during the mold closing operation, whereby interference between said product removing unit and said mold body is avoided.

6. The controller for avoiding interference according to claim 4, wherein, when it is judged that the distance between the position of said mold body and the position of said product removing unit is smaller than the predetermined distance and thereby the mold closing operation is decelerated, said speed control means changes a mold closing speed according to said distance.

7. A controller for avoiding interference between a mold body comprising a mold and a peripheral equipment installed to said mold and a product removing unit in an injection molding machine, comprising:

means for determining a distance between a position of said mold body and a position of said product removing unit;

judging means for judging whether or not said determined distance between the position of said mold body and the position of said product removing unit is smaller than a predetermined distance; and speed control means for decelerating or stopping an operation of said product removing unit during a mold opening operation and for decelerating or stopping a mold closing operation during the mold closing operation if it is judged by said judging means that said distance is smaller than the predetermined distance, whereby interference between said product removing unit and said mold body is avoided.

8. A controller for avoiding interference between a mold body comprising a mold and a peripheral equipment installed to said mold and a product removing unit in an injection molding machine, comprising:

means for determining a distance between a position of said mold body and a position of said product removing unit;

judging means for judging whether or not said determined distance between the position of said mold body and the position of said product removing unit is smaller than a first predetermined distance and a second predetermined distance; and speed control means for decelerating an operation of said product removing unit during mold opening operation and for decelerating a mold closing operation during the mold closing operation if it is judged by said judging means that said distance is smaller than the first predetermined distance, and for stopping the operation of said product removing unit during the mold opening operation and for stopping the mold closing operation during the mold closing operation if it is judged that said distance is smaller than the second predetermined distance that is smaller than the first predetermined distance, whereby interference between said product removing unit and said mold body is avoided.

9. The controller for avoiding interference according to claim 7, wherein a degree of said deceleration is changed so as to increase a said distance between the position of said mold body and the position of said product removing unit decreases.

10. The controller for avoiding interference according to claim 1, wherein the position of said mold body is defined by a point, line segment or plane set on a two-dimensional or three-dimensional outer shape, including that of a peripheral equipment installed to a movable mold and/or a fixed mold.

11. The controller for avoiding interference according to claim 1, wherein the position of said product removing unit is defined by a point on a product holding portion.

12. The controller for avoiding interference according to claim 1, wherein the position of said product removing unit is defined by a point or line segment set in a product holding portion or in an arm portion of said product removing unit.

13. The controller for avoiding interference according to claim 1, wherein, in a case where a plurality of said product removing units are provided, said judging means judges whether or not either of distances between a position of each product removing unit and the position of said mold body is smaller than the predetermined distance.

14. A controller for avoiding interference between an ejector which ejects a molded product from an opened mold and a product removing unit in an injection molding machine, comprising:

means for determining a distance between a position of said ejector and a position of said product removing unit;

judging means for judging whether or not said distance between the position of said ejector and the position of said product removing unit is smaller than a predetermined distance; and speed control means for decelerating or stopping an ejector operation if it is judged by said judging means that said distance is smaller than the predetermined distance during ejector operation, whereby interference between said ejector and said product removing unit is avoided.

15. A controller for avoiding interference between an ejector which ejects a molded product from an opened mold and a product removing unit in an injection molding machine, comprising:

means for determining a distance between a position of said ejector and a position of said product removing unit;

judging means for judging whether or not said distance between the position of said ejector and the position of said product removing unit is smaller than a predetermined distance; and speed control means for decelerating or stopping an operation of said product removing unit if it is judged by said judging means that said distance is smaller than the predetermined distance during the time when an ejector operation is stopped, whereby interference between said ejector and said product removing unit is avoided.

16. A controller for avoiding interference between ejector which ejects a molded product from an opened mold and a product removing unit in an injection molding machine, comprising:

means for determining a distance between a position of said ejector and a position of said product removing unit;

judging means for judging whether or not said distance between the position of said ejector and the position of said product removing unit is smaller than a predetermined distance; and speed control means for decelerating or stopping an operation of said ejector during the time when said ejector is operated and for decelerating or stopping an operation of said product removing unit during the time when an ejector operation is stopped if it is judged by said judging means that said distance is smaller than the predetermined distance, whereby interference between said ejector and said product removing unit is avoided.

17. The controller for avoiding interference according to claim 14, wherein in a case where a plurality of said product removing units are provided, said judging means judges whether or not either of distances between a position of each product removing unit and the position of said ejector is smaller than the predetermined distance.

* * * * *